United States Patent
Isobe et al.

(10) Patent No.: US 8,432,524 B2
(45) Date of Patent: Apr. 30, 2013

(54) ILLUMINATING DEVICE AND LIQUID CRYSTAL DISPLAY DEVICE PROVIDED WITH THE SAME

(75) Inventors: Hiroaki Isobe, Osaka (JP); Tetsuya Hamada, Osaka (JP)

(73) Assignee: Sharp Kabushi Kaisha, Osaka (JP)

( * ) Notice: Subject to any disclaimer, the term of this patent is extended or adjusted under 35 U.S.C. 154(b) by 236 days.

(21) Appl. No.: 13/003,881

(22) PCT Filed: Jun. 3, 2009

(86) PCT No.: PCT/JP2009/060142
§ 371 (c)(1),
(2), (4) Date: Jan. 13, 2011

(87) PCT Pub. No.: WO2010/016320
PCT Pub. Date: Feb. 11, 2010

(65) Prior Publication Data
US 2011/0116011 A1    May 19, 2011

(30) Foreign Application Priority Data
Aug. 8, 2008  (JP) .................................. 2008-205121

(51) Int. Cl.
G02F 1/13357  (2006.01)
G02F 1/1335   (2006.01)
F21V 7/22     (2006.01)

(52) U.S. Cl.
USPC ............................... 349/150; 349/62; 362/606

(58) Field of Classification Search ............... 349/62, 349/145–150; 362/606, 612
See application file for complete search history.

(56) References Cited

U.S. PATENT DOCUMENTS

| | | | |
|---|---|---|---|
| 4,197,586 A * | 4/1980 | Nidiffer | 361/679.09 |
| 2005/0174806 A1 | 8/2005 | Sakai et al. | |
| 2007/0195551 A1 | 8/2007 | Shin | |
| 2008/0074902 A1* | 3/2008 | Oh et al. | 362/612 |
| 2008/0248258 A1* | 10/2008 | Hao | 428/172 |
| 2010/0252307 A1* | 10/2010 | Mo | 174/254 |
| 2011/0009168 A1* | 1/2011 | Lai | 455/558 |
| 2011/0122339 A1* | 5/2011 | Hamada | 349/62 |
| 2011/0134371 A1* | 6/2011 | Shimojoh et al. | 349/65 |

FOREIGN PATENT DOCUMENTS

| | | |
|---|---|---|
| JP | 2005-010406 A | 1/2005 |
| JP | 2005-222814 A | 8/2005 |
| JP | 2005-228535 A | 8/2005 |

(Continued)

OTHER PUBLICATIONS

Official Communication issued in International Patent Application No. PCT/JP2009/060142, mailed on Jun. 30, 2009.

*Primary Examiner* — Akm Enayet Ullah
(74) *Attorney, Agent, or Firm* — Keating & Bennett, LLP

(57) ABSTRACT

Provided is an illuminating device wherein replacement of a light source is facilitated and generation of luminance non-uniformity is suppressed. An illuminating device (10) is provided with a light source module (5) which is attached to a bottom section (1a) from a rear surface side of a case member (1). On a prescribed section on the bottom section (1a), a through hole (1b) is formed, and a prescribed section of the through hole protrudes to the side of a storing space (10a). An LED (6) is arranged to face a light incoming surface (3a) of a light guide plate (3) by having the LED (6) protrude to the side of the storing space (10a) through the through hole (1b).

12 Claims, 5 Drawing Sheets

FOREIGN PATENT DOCUMENTS

| | | |
|---|---|---|
| JP | 2005-235560 A | 9/2005 |
| JP | 2006-208722 A | 8/2006 |
| JP | 2006-331969 A | 12/2006 |
| JP | 2007-227374 A | 9/2009 |

* cited by examiner

US 8,432,524 B2

ILLUMINATING DEVICE AND LIQUID CRYSTAL DISPLAY DEVICE PROVIDED WITH THE SAME

TECHNICAL FIELD

The present invention relates to an illuminating device and a liquid crystal display device provided with the same.

BACKGROUND ART

Conventionally, an illuminating device that is capable of emitting area light is known; and is used as a backlight unit for shining light onto a liquid crystal display panel of a liquid crystal display device. As such illuminating devices for the liquid crystal display device, there are a direct type, side-light type and the like.

Here, in an illuminating device of the direct type, a light source is disposed right under a liquid crystal display panel. On the other hand, in an illuminating device of the side-light type, a light guide plate is disposed right under a liquid crystal display panel; and a light source is so disposed as to face a predetermined side end surface of the light guide plate (e.g., see a patent document 1). In the illuminating device of the side-light type, when light is emitted from the light source, the light is introduced into the light guide plate via the predetermined side end surface of the light guide plate. And, the light introduced into the light guide plate turns into area light to shine onto the liquid crystal display panel.

FIG. 7 is a simplified view of a conventional illuminating device of the side-light type. With reference to FIG. 7, in the conventional illuminating device of the side-light type, a plurality of light-emitting diodes (LED) 101 are used as a light source. The plurality of LEDs 101 as the light source are disposed on the same flexible printed wiring board (FPC) 102 to be a module.

Besides, a light guide plate 103 that converts the light from the LED 101 into area light is composed of a transparent plate member, and has: four side end surfaces; a front surface and a rear surface that are perpendicular to the four side end surfaces. A predetermined side end surface of the four side end surfaces of the light guide plate 103 is a surface which is disposed to face the LED 101 and functions as a light incident surface that introduces the light from the LED 101 into the light guide plate 103. Besides, the front surface of the light guide plate 103 is a surface that faces toward a liquid crystal display panel (not shown) and functions as a light output surface which outputs the light introduced into the light guide plate 103 as the area light to the liquid crystal display panel. And, the fixing of the LED 101 with respect to the light guide plate 103 is performed by adhering part of the FPC 102, on which the LED 101 is disposed, to the rear surface of the light guide plate 103.

In the above conventional structure, the LED 101, the light guide plate 103 and the like are used with housed in the inside of a case member (not shown) (e.g., see a patent document 2). The case member in which the LED 101, the light guide plate 103 and the like are housed has, for example: a bottom portion; and four side portions which are disposed upright on an outer circumferential portion of the bottom portion; and is formed into a box shape in such a way that a region enclosed by the four side portions on the bottom portion serves as a housing space. And, an opening side (opposite to the bottom portion side) of the case member is closed by a liquid crystal display panel (no shown) that is illuminated by the illuminating device.

PRIOR-ART DOCUMENT

Patent Document

Patent document 1: JP-A-2005-235560
Patent document 2: JP-A-2006-331969

SUMMARY OF THE INVENTION

Problems to be Solved by the Invention

In a case where the above conventional illuminating device is disposed in a liquid crystal display device, the LED 101 is housed in the inside of the case member (not shown) and the opening of the case member is closed by the liquid crystal display panel (not shown), so that there is a problem that even if the LED 101 reaches the end of the life, it is hard to replace the LED 101.

In the mean time, in a case where the use of the liquid crystal display device in which the above conventional illuminating device is disposed is for industry, a disadvantage rises, in which a warp easily occurs in the light guide plate 103 because of heat generation from around the liquid crystal display device; and the display quality deteriorates. Accordingly, in such a case, to curb occurrence of the warp and the like in the light guide plate 103, the plate thickness of the light guide plate 103 is often designed to be large. However, in the above conventional structure, in the case where the plate thickness of the light guide plate 103 is designed to be large, as shown in FIG. 8, the LED 101 is disposed at an end in a plate-thickness direction of the light guide plate 103, so that there is a problem that belt-shape brightness unevenness becomes highly likely to occur. Here, arrows L in FIG. 8 show behavior of the light. Besides, a region 110a in FIG. 8 is a region which becomes dark, while a region 110b in FIG. 8 is a region which becomes bright.

The present invention has been made to resolve the above problems, and it is an object of the present invention to provide: an illuminating device that is capable of facilitating replacement of a light-emitting diode as a light source and curbing occurrence of brightness unevenness; and a liquid crystal display device that includes the illuminating device.

Means for Solving the Problem

To achieve the above object, an illuminating device according to a first aspect of the present invention includes: a case member that has at least a bottom portion and an upper surface of the bottom portion serves as a housing space; a light guide plate that is housed in the housing space, and has: a light incident surface which includes a predetermined side end surface; and a light output surface that is perpendicular to the light incident surface and includes a surface which faces toward an illuminated body; and a light source module that includes at least a light-emitting diode which is mounted on the bottom portion of the case member from a rear surface side opposite to the upper surface side of the bottom portion of the case member; and disposed to face the light incident surface of the light guide plate. And, a predetermined portion of the bottom portion of the case member is provided with a through-hole; and the predetermined portion where the through-hole of the bottom portion of the case member is formed protrudes beyond another portion of the bottom portion of the case member toward the housing space; and the light-emitting diode is protruded toward the housing space via the through-hole of the bottom portion of the case member, thereby the light-emitting diode is disposed to face the light incident surface of the light guide plate.

In the illuminating device according to the first aspect, as described above, the predetermined portion (portion where the light source module is disposed) of the bottom portion of the case member is provided with the through-hole, so that it is possible to protrude, via the through-hole of the bottom portion of the case member, the light-emitting diode from the rear surface side of the bottom portion of the case member toward the housing space. Because of this, even if the light source module is disposed on the bottom portion of the case member from the rear surface side of the bottom portion of the case member, it is possible to obtain a state in which the light-emitting diode is disposed to face the light incident surface of the light guide plate that is housed in the housing space. In this case, it is possible to remove the light source module from the rear surface side of the bottom portion of the case member, so that it is possible to facilitate the replacement of the light-emitting diode as the light source.

Besides, in the illuminating device according to the first aspect, as described above, the predetermined portion of the bottom portion of the case member where the through-hole is formed is protruded beyond the other portion of the bottom portion of the case member toward the housing space, so that when the light-emitting diode is protruded toward the housing space via the through-hole of the bottom portion of the case member, it is possible to place the light-emitting diode close to a center in a plate-thickness direction of the light guide plate which is disposed in the housing space. Accordingly, it is possible to curb occurrence of a disadvantage that belt-shape brightness unevenness becomes highly likely to occur because of the disposition of the light-emitting diode at the end in the plate-thickness direction of the light guide plate.

In the illuminating device according to the first aspect, preferably, a protrusion height of the predetermined portion, where the through-hole of the bottom portion of the case member is formed, toward the housing space is set in such a way that when the light-emitting diode is protruded toward the housing space via the through-hole of the bottom portion of the case member, the light-emitting diode comes close to the center in the plate-thickness direction of the light guide plate which is disposed in the housing space. According to this structure, it is possible to easily curb occurrence of belt-shape brightness unevenness.

In the illuminating device according to the first aspect, preferably, a plurality of the light-emitting diodes are arranged away from each other by a predetermined distance; by means of a partition portion which is disposed in a direction perpendicular to an arrangement direction of the plurality of light-emitting diodes, the through-hole of the bottom portion of the case member is divided into two or more hole portions; and a predetermined number of the light-emitting diodes protrude toward the housing space via each of the two or more divided hole portions of the bottom portion of the case member. According to this structure, the partition portion disposed in the through-hole of the bottom portion of the case member functions as a reinforcement portion, so that it is possible to reinforce the predetermined portion of the bottom portion of the case member where the through-hole is formed. Because of this, even if the through-hole is formed through the predetermined portion of the bottom portion of the case member, it is possible to curb deterioration of the strength of the case member.

In this case, preferably, a width of the partition portion disposed in the through-hole of the bottom portion of the case member is so set as to become smaller than a distance between the light-emitting diodes adjacent to each other. According to this structure, even if the partition portion is disposed in the through-hole of the bottom portion of the case member, it is possible to protrude each of the plurality of light-emitting diodes arranged away from each other by the predetermined distance via the through-hole (two or more hole portions) of the bottom portion of the case member toward the housing space.

In the illuminating device according to the first aspect, it is preferable that the light source module further includes a heat radiation plate on which the light-emitting diode is disposed and which is attached to the bottom portion of the case member; and the heat radiation plate is folded along a step portion that occurs from protruding the predetermined portion, where the through-hole of the bottom portion of the case member is formed, toward the housing space. According to this structure, it is possible to easily protrude the light-emitting diode disposed on the heat radiation plate toward the housing space via the through-hole of the bottom portion of the case member.

In the illuminating device according to the first aspect, preferably, the step portion, which occurs from protruding the predetermined portion where the through-hole of the bottom portion of the case member is formed toward the housing space, is inclined in an obliquely downward direction toward the light incident surface of the light guide plate; and a reflection sheet is disposed along the inclination direction of the step portion of the bottom portion of the case member. According to this structure, light (which does not travel to the light incident surface of the light guide plate) that travels into a region (space) between the light-emitting diode and the light incident surface of the light guide plate is reflected to the light incident surface of the light guide plate, so that it is possible to curb decrease of the light that enters the light incident surface of the light guide plate. Accordingly, it is possible to curb deterioration of the light use efficiency.

A liquid crystal display device according to a second aspect of the present invention includes: the illuminating device according to the first aspect; and a liquid crystal display panel onto which light from the illuminating device is shined. According to this structure, it is possible to easily facilitate the replacement of the light-emitting diode as the light source and curb occurrence of brightness unevenness.

Advantages of the Invention

As described above, according to the present invention, it is possible to easily obtain an illuminating device that is capable of facilitating replacement of a light-emitting diode as a light source and curbing occurrence of brightness unevenness; and a liquid crystal display device that includes the illuminating device.

BEST MODE FOR CARRYING OUT THE INVENTION

Hereinafter, an illuminating device 10 according to the present embodiment is described with reference to FIG. 1 to FIG. 4.

Figure 1:
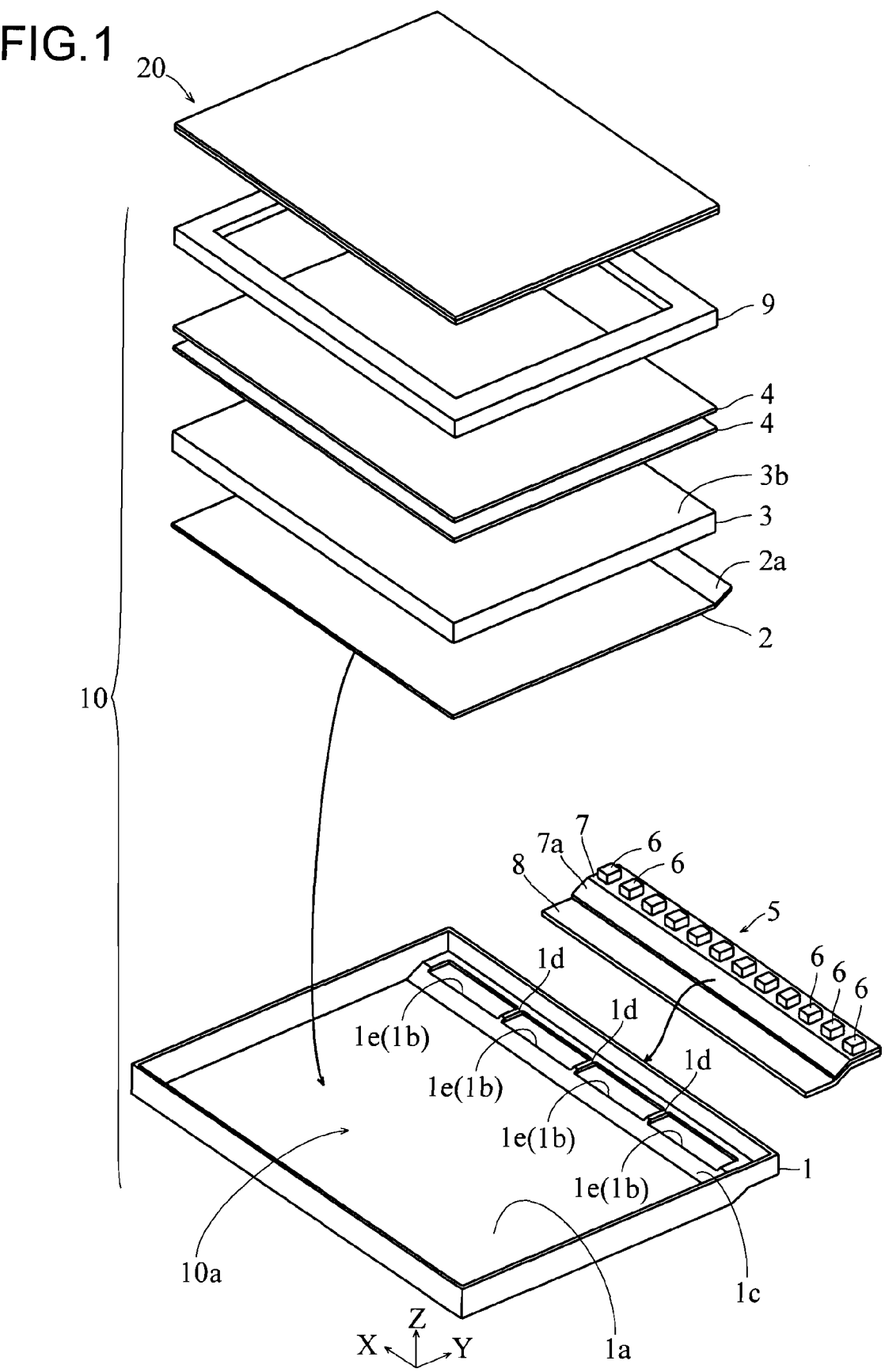
FIG. 1 is an exploded perspective view of an illuminating device according to an embodiment of the present invention.

The illuminating device 10 according to the present embodiment, as shown in FIG. 1, is used as a backlight unit that is disposed in a liquid crystal display device; and is so structured as to generate area light and to shine the light onto a liquid crystal display panel (illuminated body) 20 from a rear surface side of the liquid crystal display panel 20. Here, the illuminating device 10 according to the present embodiment is disposed, for example, in a liquid crystal display device for industrial use.

Figure 2:
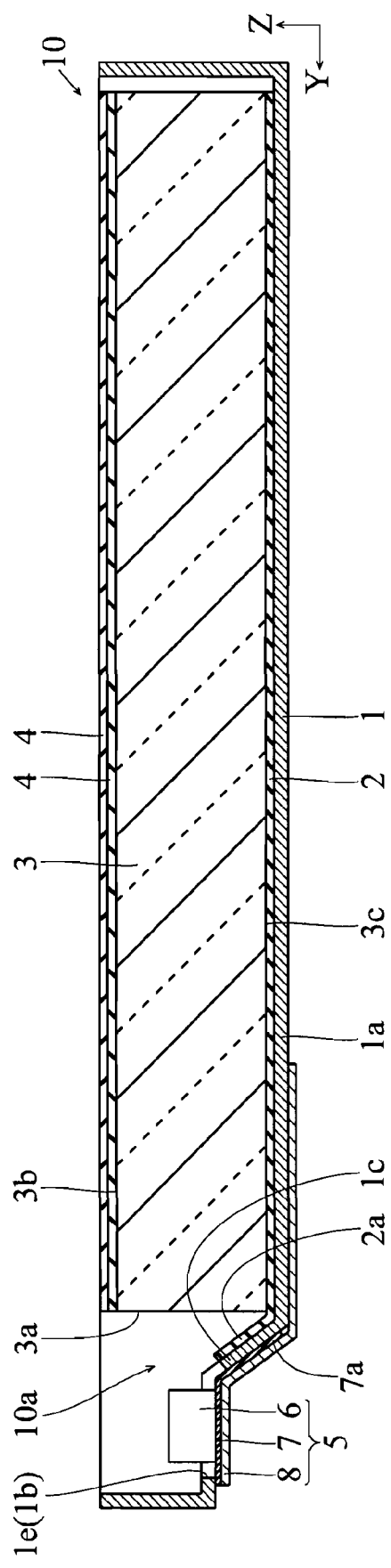
FIG. 2 is a sectional view of the illuminating device according to the embodiment shown in FIG. 1.
Figure 3:
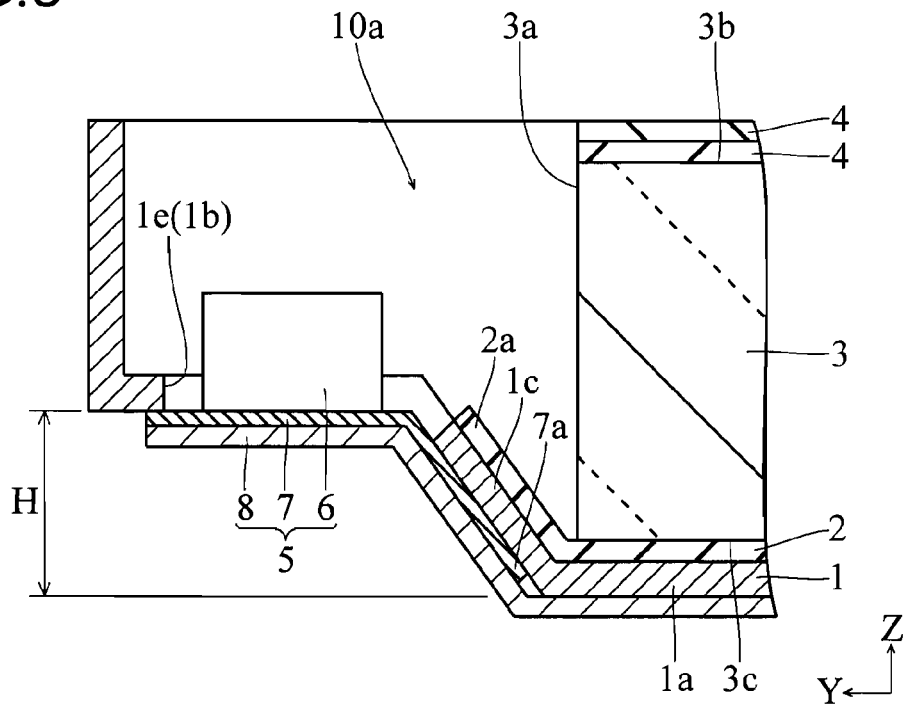
FIG. 3 is an enlarged view of a light source module of the illuminating device and a peripheral potion of the light source module according to the embodiment shown in FIG. 1.

Besides, the illuminating device 10, as shown in FIG. 1 to FIG. 3, is of a side-light type; and includes at least: a case member 1; a reflection sheet 2; a light guide plate 3; an optical sheet 4; and a light source module 5. And, a structure is employed, in which the reflection sheet 2, the light guide plate 3, the optical sheet 4 and the light source module 5 are mounted in the case member 1.

The case member 1 is composed of a metal plate (e.g, an aluminum plate or a stainless plate) and a resin-formed component; and is formed into a box shape that has an opening at the liquid crystal display 20 side. In other words, the case member 1 has: a quadrangular bottom portion 1a when viewed in a planar fashion; and four side portions that are disposed upright on an outer circumferential portion of the bottom portion 1a. And, an upper surface (which faces toward the liquid crystal display panel 20) of the bottom portion 1a of the case member 1 serves as a housing space 10a; and in the housing space 10a, the reflection sheet 2, the light guide plate 3 and the optical sheet 4 are housed.

The reflection sheet 2 is disposed on the upper surface of the bottom portion 1a of the case member 1; and covers a rear surface 3c of the light guide plate 3 described later. Because the reflection sheet 2 is disposed, even if light leaks from the rear surface 3c of the light guide plate 3, the light is reflected by the reflection sheet 2, so that it is possible to reintroduce the light leaking from the rear surface 3c of the light guide plate 3 into the light guide plate 3.

The light guide plate 3 guides light from the light-emitting diode (LED) 6 described later toward the liquid crystal display panel 20; and is disposed on the reflection sheet 2. The light guide plate 3 is composed of a transparent resin-formed plate member; and has: four side end surfaces that include a predetermined side end surface 3a which is disposed to face the LED 6; a front surface 3b and a rear surface 3c that extend to the four side end surfaces. And, the predetermined side end surface 3a of the light guide plate 3 functions as a light incident surface that introduces the light from the LED 6 into the light guide plate 3. Besides, the front surface 3b of the light guide plate 3 is a surface that is perpendicular to the light incident surface 3a of the light guide plate 3 and faces toward the liquid crystal display panel 20; and functions as a light output surface that outputs the light introduced into the light guide plate 3 as area light in a direction toward the liquid crystal display panel 20. Here, it the following description, the predetermined side end surface 3a of the light guide plate 3 is called the light incident surface 3a, while the front surface 3b of the light guide plate 3 is called the light output surface 3b.

The optical sheet 4 includes a diffusion sheet, a prism sheet and the like; and is disposed on the light output surface 3b of the light guide plate 3. By means of the optical sheet 4, diffusion and collection of the light output from the light output surface 3b of the light guide plate 3 are performed.

The light source module 5 is disposed on the bottom portion 1a of the case member 1, and includes: a plurality of LEDs 6; a flexible printed wiring board (FPC) 7 on which the plurality of LEDs 6 are disposed; and the like. The plurality of LEDs 6 are arranged away from each other by a predetermined distance in a direction (X direction) along the light incident surface 3a of the light guide plate 3 in such a way that each of the LEDs 6 faces the light incident surface 3a of the light guide plate 3. Besides, the plurality of LEDs 6 are disposed on the FPC 7 and disposed on a heat radiation plate 8 that radiates heat generated from the LEDs 6. In other words, the FPC 7 is adhered to the heat radiation plate 8. Here, the disposition of the light source module 5 onto the bottom portion 1a of the case member 1 is performed by screwing the heat radiation plate 8 onto the bottom portion 1a of the case member 1 from the rear surface side of the bottom portion 1a of the case member 1.

Here, in the present embodiment, a predetermined portion (where the light source unit 5 is disposed) of the bottom portion 1a of the case member 1 is provided with through-holes 1b that penetrate the bottom portion 1a of the case member 1. The through-hole 1b of the bottom portion 1a of the case member 1 allows the LED 6 to protrude from the rear surface side of the bottom portion 1a of the case member 1 toward the housing space 10a when the light source module 5 is disposed onto the bottom portion 1a of the case member 1. In other words, when the light source module 5 is disposed onto the bottom portion 1a of the case member 1, a state is obtained, in which the LED 6 protrudes toward the housing space 10a via the through-hole 1b of the bottom portion 1a of the case member 1. And, by protruding the LED 6 toward the housing space 10a via the through-hole 1b of the bottom portion 1a of the case member 1, the LED 6 is disposed to face the light incident surface 3a of the light guide plate 3.

Besides, the predetermined portion, where the through-hole 1b of the bottom portion 1a of the case member 1 is formed, protrudes beyond the other portion (where the light guide plate 3 is placed) of the bottom portion 1a of the case member 1 toward the housing space 10a in such a way that the predetermined portion is disposed on a region which faces the light incident surface 3a of the light guide plate 3. The protrusion height H of the predetermined portion, where the through-hole 1b of the bottom portion 1a of the case member 1 is formed, toward the housing space 10a is set in such a way that when the LED 6 is protruded toward the housing space 10a via the through-hole 1b of the bottom portion 1a of the case member 1, the LED 6 comes close to a center in a plate-thickness direction (Z direction) of the light guide plate 3.

Here, a step portion 1c, which connects the predetermined portion where the through-hole 1b of the bottom portion 1a of the case member 1 is formed and the other portion to each other, occurs from protruding the predetermined portion, where the through-hole 1b of the bottom portion 1a of the case member 1 is formed, toward the housing space 10a; and is inclined in an obliquely downward direction toward the light incident surface 3a of the light guide plate 3. And, an end portion 2a of the reflection sheet 2 close to the LED 6 is extended onto the step portion 1c of the bottom portion 1a of the case member 1; and the end portion 2a of the reflection sheet 2 close to the LED 6 is attached onto the step portion 1c of the bottom portion 1a of the case member 1. Accordingly, the step portion 1c of the bottom portion 1a of the case member 1 functions as a light reflection portion that has a high light reflectivity, so that the light, which is reflected to the light incident surface 3a of the light guide plate 3 in the region (space) between the LED 6 and the light incident surface 3a of the light guide plate 3, increases.

In the mean time, the step portion 1c occurs in the predetermined portion (where the through-hole 1b is formed) of the bottom portion 1a of the case member 1 where the heat radiation plate 8 is disposed, so that the heat radiation plate 8 where the LED 6 is disposed is folded along the step portion 1c of the bottom portion 1a of the case member 1. And, the FPC 7 adhered to the heat radiation plate 8 is folded into the shape of the heat radiation plate 8 in such a way that a wiring region 7a is disposed on the inclined portion of the heat radiation plate 8.

Figure 4:
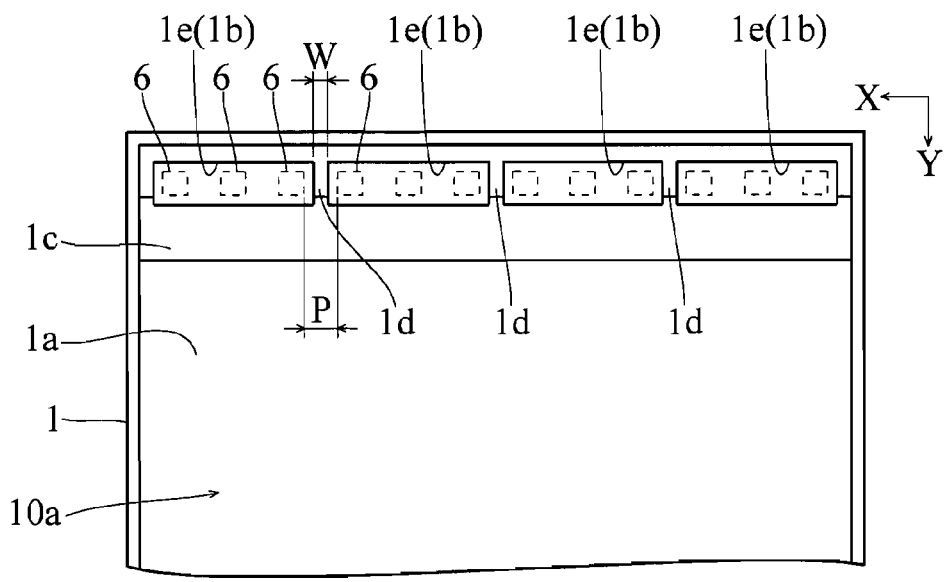
FIG. 4 is a plan view of a case member of the illuminating device according to the embodiment shown in FIG. 1.

Besides, in the present embodiment, as shown in FIG. 4, by means of a partition portion 1d which is disposed in a direction (Y direction) perpendicular to an arrangement direction (X direction) of the LEDs 6, the through-hole 1b of the bottom portion 1a of the case member 1 is divided into two or more hole portions 1e the number of which is smaller than the number of LEDs 6. The partition portion 1d disposed in the through-hole 1b of the bottom portion 1a of the case member 1 is a portion of the bottom portion 1a of the case member 1; and a width (width in the arrangement direction (X direction) of the LEDs 6) W is so set as to be smaller than a distance P between the LEDs 6 adjacent to each other. And, a predetermined number of the LEDs 6 protrude from each of the two or more divided hole portions 1e of the bottom portion 1a of the case member 1 toward the housing space 10a.

Besides, as shown in FIG. 1, with the reflection sheet 2, the light guide plate 3 and the optical sheet 4 placed in this order on the upper surface of the bottom portion 1a of the case member 1, a quadrangular frame 9 is disposed on the opening of the case member 1. And, by means of an edge portion of the frame 9, the optical sheet 4 is pushed from over.

Figure 5:
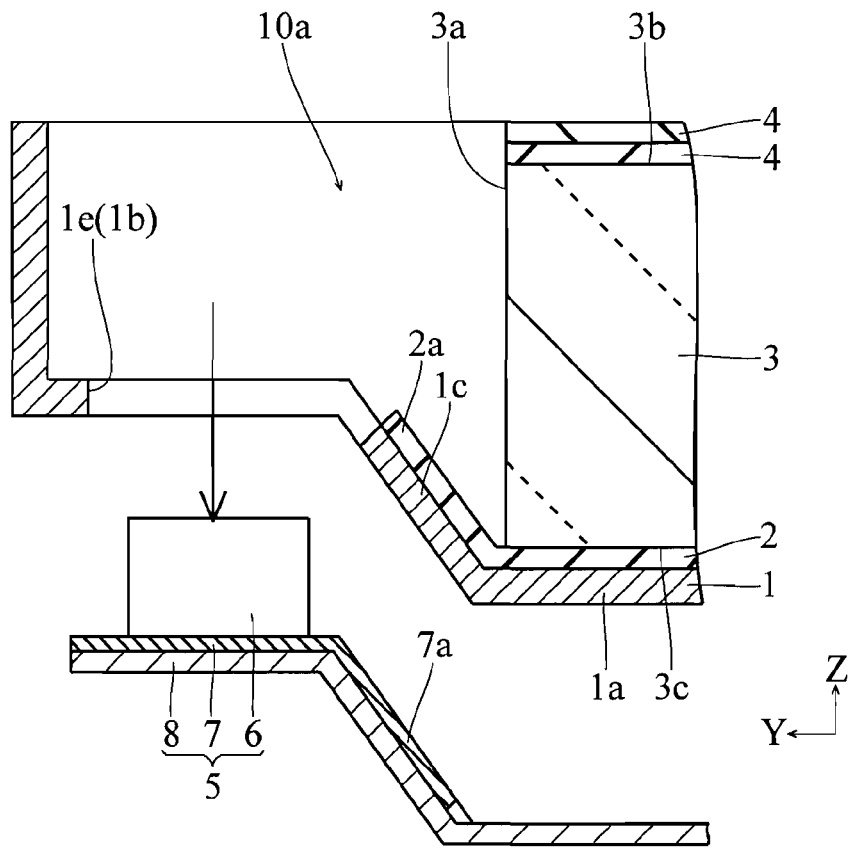
FIG. 5 is a view when the light source module is removed from the case member of the illuminating device according to the embodiment shown in FIG. 1.

In the present embodiment, as described above, the through-hole 1b is formed through the predetermined portion (where the light source module 5 is disposed) of the bottom portion 1a of the case member 1, so that it is possible to protrude the LED 6 from the rear surface side of the bottom portion 1a of the case member 1 toward the housing space 10a via the through-hole 1b of the bottom portions 1a of the case member 1. Because of this, even if the light source module 5 is disposed onto the bottom portion 1a of the case member 1 from the rear surface side of the bottom portion 1a of the case member 1, it is possible to obtain the state in which the LED 6 is disposed to face the light incident surface 3a of the light guide plate 3 that is housed in the housing space 10a. In this case, as shown in FIG. 5, it is possible to replace the LED 6 by removing the light source module 5 from the rear surface side of the bottom portion 1a of the case member 1, it becomes possible to facilitate the replacement of the LED 6 as the light source.

Besides, in the present embodiment, as described above, the predetermined portion, where the through-hole 1b of the bottom portion 1a of the case member 1 is formed, is protruded beyond the other portion of the bottom portion 1a of the case member 1 toward the housing space 10a, so that when the LED 6 is protruded toward the housing space 1a via the through-hole 1b of the bottom portion 1a of the case member 1, it is possible to place the LED 6 close to the center in the plate-thickness direction of the light guide plate 3 which is disposed in the housing space 10a. Accordingly, it is possible to curb occurrence of a disadvantage that belt-shape brightness unevenness becomes highly likely to occur because of disposition of the LED 6 at the end in the plate-thickness direction of the light guide plate 3.

Besides, in the present embodiment, as described above, by means of the partition portion 1d which is disposed in the direction perpendicular to the arrangement direction of the LEDs 6, the through-hole 1b of the bottom portion 1a of the case member 1 is divided into the two or more hole portions 1e, so that the partition portion 1d disposed in the through-hole 1b of the bottom portion 1a of the case member 1 functions as the reinforcement portion; and it is possible to reinforce the predetermined portion where the through-hole 1b of the bottom portion 1a of the case member 1 is formed. Because of this, even if the through-hole 1b is formed through the predetermined portion of the bottom portion 1a of the case member 1, it is possible to curb deterioration of the strength of the case member 1.

In this case, the width W of the partition portion 1d disposed in the through-hole 1b of the bottom portion 1a of the case member 1 is so set as to be smaller than the distance P between the LEDs 6 adjacent to each other, so that even if the partition portion 1d is disposed in the through-hole 1b of the bottom portion 1a of the case member 1, it is possible to protrude each of the plurality of LEDs 6 arranged away from each other by the predetermined distance via the through-hole 1b (two or more hole portions 1e) of the bottom portion 1a of the case member 1 toward the housing space 10a.

Besides, in the present embodiment, as described above, the heat radiation plate 8 is folded along the step portion 1c of the bottom portion 1a of the case member 1, so that it is possible to easily protrude the LED 6 disposed on the heat radiation plate 8 toward the housing space 10a via the through-hole 1b of the bottom portion 1a of the case member 1.

Besides, in the present embodiment, as described above, the end portion 2a of the reflection sheet 2 close to the LED 6 is extended onto the step portion 1c of the bottom portion 1a of the case member 1; and the end portion 2a of the reflection sheet 2 close to the LED 6 is attached onto the step portion 1c of the bottom portion 1a of the case member 1, so that because the light (which does not travel to the light incident surface 3a of the light guide plate 3) that travels into the region (space) between the LED 6 and the light incident surface 3a of the light guide plate 3 is reflected to the light incident surface 3a of the light guide plate 3, it is possible to curb decrease of the light that enters the light incident surface 3a of the light guide plate 3. Accordingly, it is possible to curb deterioration of the light use efficiency.

It should be considered that the embodiments disclose this time are examples in all respects and are not limiting. The scope of the present invention is not indicated by the above description of the embodiments but by the claims, and all modifications within the scope of the claims and the meaning equivalent to the claims are covered.

For example, in the above embodiments, the plurality of LEDs are disposed on the same FPC; however, the present invention is not limited to this, and the FPC may be divided into two or more FPCs and a predetermined number of LEDs may be disposed on each of the two or more divided FPCs.

Besides, in the above embodiments, the through-hole of the bottom portion of the case member is divided into the two or more hole portions the number of which is smaller than the number of the LEDs; however, the present invention is not limited to this, and the number of the divided hole portions of the bottom portion of the case member may be equal to the number of the LEDs.

Figure 6:
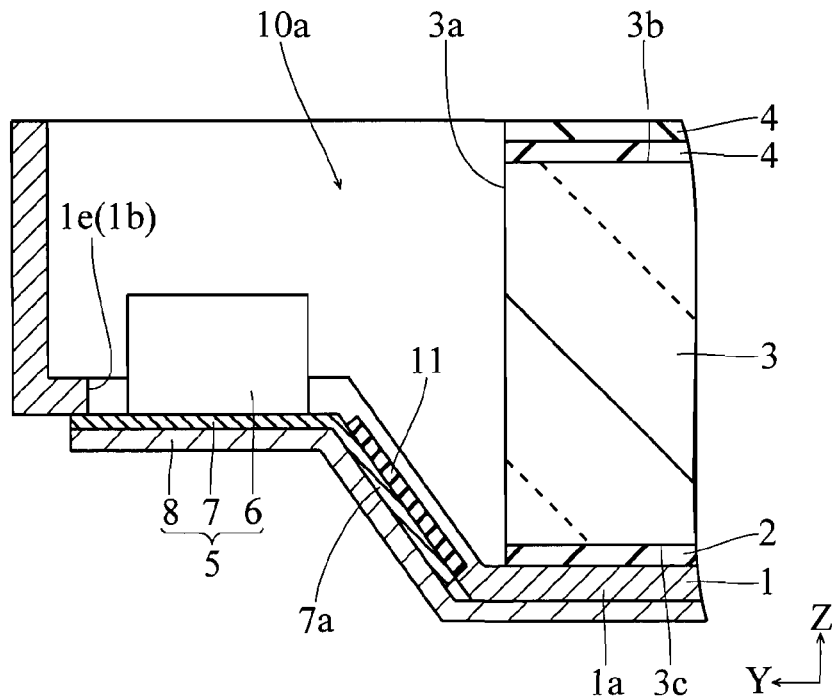
FIG. 6 is an enlarged view of a light source module of an illuminating device and a peripheral potion of the light source module according to a modification of the present invention.
Figure 7:
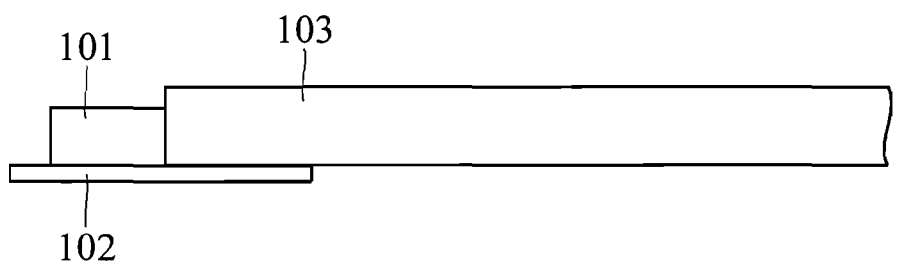
FIG. 7 is a simplified view of a conventional illuminating device of a side-light type.
Figure 8:
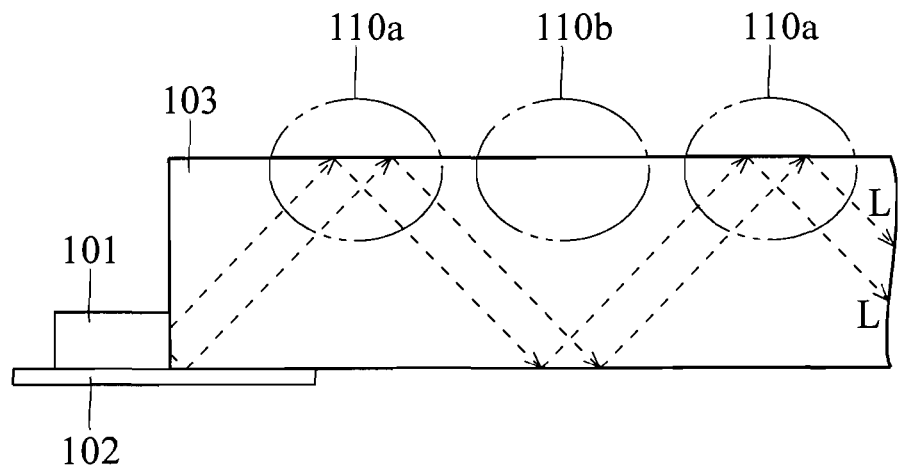
FIG. 8 is a view for describing a conventional problem.

Besides, in the above embodiments, the end portion of the reflection sheet close to the LED is extended onto the step portion of the bottom portion of the case member, and the end portion of the reflection sheet close to the LED is attached onto the step portion of the bottom portion of the case member; however, the present invention is not limited to this, and as shown in FIG. 6, the inclined portion (wiring region 7a of the FPC 7) of the heat radiation plate 8 may be exposed toward the housing space 10a and a reflection sheet 11 prepared additionally may be attached there.

List of Reference Symbols
- 1 case member
- 1a bottom portion
- 1b through-hole
- 1c step portion
- 1d partition portion
- 1e hole portion
- 2, 11 reflection sheet
- 2a end portion
- 3 light guide plate
- 3a light incident surface
- 3b light output surface
- 5 light source module
- 6 LED (light-emitting diode)
- 8 heat radiation plate
- 10 illuminating device
- 10a housing space
- 20 liquid crystal display panel

The invention claimed is:

1. An illuminating device comprising:
a case member that has at least a bottom portion and an upper surface of the bottom portion serves as a housing space;
a light guide plate that is housed in the housing space, and has at least: a light incident surface which includes a predetermined side end surface; and a light output surface that is perpendicular to the light incident surface and includes a surface which faces toward an illuminated body; and
a light source module that includes at least a light-emitting diode which is mounted on the bottom portion of the case member from a rear surface side opposite to the upper surface side of the bottom portion of the case member; and disposed to face the light incident surface of the light guide plate;
wherein a predetermined portion of the bottom portion of the case member is provided with a through-hole; and the predetermined portion where the through-hole of the bottom portion of the case member is formed protrudes beyond another portion of the bottom portion of the case member toward the housing space; and
the light-emitting diode is protruded toward the housing space via the through-hole of the bottom portion of the case member, thereby the light-emitting diode is disposed to face the light incident surface of the light guide plate.

2. The illuminating device according to claim 1, wherein a protrusion height of the predetermined portion, where the through-hole of the bottom portion of the case member is formed, toward the housing space is set in such a way that when the light-emitting diode is protruded toward the housing space via the through-hole of the bottom portion of the case member, the light-emitting diode comes close to a center in a plate-thickness direction of the light guide plate which is disposed in the housing space.

3. The illuminating device according to claim 1, wherein
a plurality of the light-emitting diodes are arranged away from each other by a predetermined distance;
by means of a partition portion which is disposed in a direction perpendicular to an arrangement direction of the plurality of the light-emitting diodes, the through-hole of the bottom portion of the case member is divided into two or more hole portions; and
a predetermined number of the light-emitting diodes protrude toward the housing space via each of the two or more divided hole portions of the bottom portion of the case member.

4. The illuminating device according to claim 3, wherein a width of the partition portion disposed in the through-hole of the bottom portion of the case member is so set as to become smaller than a distance between the light-emitting diodes adjacent to each other.

5. The illuminating device according to claim 1, wherein
the light source module further includes a heat radiation plate on which the light-emitting diode is disposed and which is attached to the bottom portion of the case member; and
the heat radiation plate is folded along a step portion that occurs from protruding the predetermined portion, where the through-hole of the bottom portion of the case member is formed, toward the housing space.

6. The illuminating device according to claim 1, wherein
a step portion, which occurs from protruding the predetermined portion where the through-hole of the bottom portion of the case member is formed toward the housing space, is inclined in an obliquely downward direction toward the light incident surface of the light guide plate; and
a reflection sheet is disposed along the inclination direction of the step portion of the bottom portion of the case member.

7. A liquid crystal display device comprising:
the illuminating device according to claim 1; and
a liquid crystal display panel onto which light from the illuminating device is shined.

8. A liquid crystal display device comprising:
the illuminating device according to claim 2; and
a liquid crystal display panel onto which light from the illuminating device is shined.

9. A liquid crystal display device comprising:
the illuminating device according to claim 3; and
a liquid crystal display panel onto which light from the illuminating device is shined.

10. A liquid crystal display device comprising:
the illuminating device according to claim 4; and
a liquid crystal display panel onto which light from the illuminating device is shined.

11. A liquid crystal display device comprising:
the illuminating device according to claim 5; and
a liquid crystal display panel onto which light from the illuminating device is shined.

12. A liquid crystal display device comprising:
the illuminating device according to claim 6; and
a liquid crystal display panel onto which light from the illuminating device is shined.

* * * * *